United States Patent
Oda et al.

[11] Patent Number: 6,027,260
[45] Date of Patent: Feb. 22, 2000

[54] CAMERA SHUTTER AND DRIVING DEVICE HAVING PIEZOELECTRIC ELEMENT FOR USE THEREWITH

[75] Inventors: Hajime Oda; Tadashi Ishikawa, both of Yotsukaido, Japan

[73] Assignee: Seiko Precision Inc., Japan

[21] Appl. No.: 08/990,630

[22] Filed: Dec. 15, 1997

[30] Foreign Application Priority Data

Dec. 13, 1996 [JP] Japan ................................. 8-333413

[51] Int. Cl.$^7$ .............................. G03B 9/14; H01L 41/04
[52] U.S. Cl. ......................... 396/497; 396/248; 310/328
[58] Field of Search .................................. 396/248, 452, 396/463, 469, 493, 497; 310/328; 348/219

[56] References Cited

U.S. PATENT DOCUMENTS

| | | | |
|---|---|---|---|
| 4,162,832 | 7/1979 | Frank et al. | 396/248 |
| 4,884,090 | 11/1989 | Tananka et al. | 396/463 |
| 4,935,659 | 6/1990 | Naka et al. | 310/328 |
| 4,989,030 | 1/1991 | Naka et al. | 396/235 |
| 5,008,699 | 4/1991 | Tominaga et al. | 396/165 |
| 5,307,170 | 4/1994 | Itsumi et al. | 348/219 |
| 5,659,821 | 8/1997 | Kawakita et al. | 396/248 |

*Primary Examiner*—Eddie C. Lee
*Assistant Examiner*—J. K. Han
*Attorney, Agent, or Firm*—Adams & Wilks

[57] ABSTRACT

A camera shutter having a shutter aperture, shutter blades, and a driving device for driving the shutter blades to open and close the shutter aperture. The driving device includes a pair of lever members spaced apart and confronting each other across the shutter aperture, each of the lever members having a first end portion and a second end portion. A piezoelectric element is connected to and between the lever members at the first end portions thereof for undergoing elastic deformation to oscillate the lever members. An elastic member is connected to and between the lever members at the second end portions thereof for undergoing elastic displacement in response to oscillation of the lever members. A transmission member is integrally connected to a central portion of the elastic member for transmitting the displacement of the elastic member to the shutter blades to open and close the shutter aperture.

41 Claims, 7 Drawing Sheets

CAMERA SHUTTER AND DRIVING DEVICE HAVING PIEZOELECTRIC ELEMENT FOR USE THEREWITH

BACKGROUND OF THE INVENTION

1. Field of the Invention

The present invention relates generally to a shutter construction and, more particularly, to a camera shutter and a driving device in which a piezoelectric element is employed for opening and closing shutter blades of the camera shutter.

2. Related Art

There are various types of camera shutters, most of which are adopted to use a spring and/or a motor as a drive source for opening/closing shutter blades of the camera shutter. A conventional shutter construction using a step motor as the drive source for opening/closing the shutter blades is disclosed, for example, in Examined Published Japanese Utility Model Publication No. 62-142035 or in Examined Published Japanese Patent Application No. 4-74693.

As an example of the construction adopting the step motor as the drive source for opening/closing the shutter blades, a motor driven shutter as disclosed in the Examined Published Japanese Utility Model No. 62-142035 will be described below. The step motor is constructed by winding coils on a pair of stators attached to a base plate and by fitting a rotor having a permanent magnet in a space, which is surrounded by the magnetic pole portions of the individual stators, such that the rotor shaft is disposed vertical to the stators. A rotor pinion is fixed on the rotor shaft so that the shutter blades are rocked by the rotation of the rotor through a gear train including the rotor pinion.

In the conventional motor driven shutter described above, the mechanism for driving the shutter blades has a complex construction because it requires a motor comprising stators, coils and a rotor, and a gear train for transmitting the rotation of the motor to the shutter blades. Although the drive mechanism disclosed in Examined Published Japanese Utility Model No. 62-142035 is designed to suppress an increase in size of the mechanism as much as possible, a reduction of the overall size of the shutter is still restricted due to the requirement of a motor for opening/closing the shutter blades as described above. For example, in order to increase the opening/closing rate of the shutter blades (i.e., the shutter speed), a higher motor rotation speed is required. In order to increase the speed of the motor, however, an increase in the number of coil turns is required. Accordingly, the overall construction of the camera shutter becomes complicated and a meaningful reduction in size (e.g., thickness) of the camera shutter is not rendered possible.

SUMMARY OF THE INVENTION

In order to solve the foregoing problems in the conventional art, an object of the present invention is to provide a camera shutter having a simple construction and which is of a reduced size as compared to camera shutters of the conventional art. This object is accomplished by providing a camera shutter and a driving device which employs a piezoelectric element as the drive source for opening and closing shutter blades of the camera shutter.

In one aspect, the present invention is directed to a driving device for a camera shutter. The driving device comprises a pair of spaced-apart lever members each having first and second end portions and mounted for displacement about hinge portions provided at the first end portions thereof. A piezoelectric element is interposed between the first end portions of the lever members for undergoing elastic movement to displace the lever members. An elastic member is interposed between the second end portions of the lever members for undergoing elastic displacement in response to rocking motion of the lever members. A transmission member is connected at a first end thereof to a central portion of the elastic member and at a second end thereof to shutter blades of the camera shutter for transmitting the elastic displacement of the elastic member to the shutter blades to open/close the shutter blades. The transmission member has a drive portion which is operably connected to the shutter blades and which undergoes reciprocal displacement (i.e., back and forth movement) in response to rocking motion of the lever members. During rocking motion of the lever members resulting from the elastic movement of the piezoelectric element, the elastic member is warped at its central portion and the deformation thereof is transmitted to the shutter blades by the transmission member through the reciprocal displacement of the drive portion to open/close the shutter blades. The magnitude of the displacement of the drive portion can establish the amplitude necessary for opening/closing the shutter blades because the amplitude of the piezoelectric element is enlarged by the lever members and further by the elastic member.

The piezoelectric element is mounted at opposite ends thereof to and between respective abutment portions of the lever members at the first end portions thereof. Preferably, the distance between the lever members at the second end portions thereof is greater than the distance between the abutment portions of the lever members at the first end portions thereof. By this construction, the elastic member interposed between the lever members at the second end portions thereof can be provided with an elongated length to enable a greater magnification of the elastic movement of the piezoelectric element. That is, the span of the elastic member between the lever members can be elongated to make the amplitude of the center portion of the elastic member larger than the displacement of the lever members, thereby increasing the magnification factor of the elastic movement of the piezoelectric element.

In one embodiment, the hinge portions of the lever members are disposed between the piezoelectric element and the elastic member whereby elastic movement of the piezoelectric element displaces the lever members in a first direction. In another embodiment, the oscillating direction of the lever members is inverted to a second direction by disposing the piezoelectric element between the hinge portions of the lever members and the elastic member. Displacement of the lever members in either of the first and second directions according to the foregoing embodiments causes elastic displacement of the elastic member which is transmitted to shutter blades of a camera shutter by the transmission member and the drive member to open/close the shutter blades.

Preferably, the lever members are connected to each other by a mounting portion having opposite ends respectively connected to the hinge portions of the lever members. The mounting portion provides a means for fixing the driving device during use thereof, such as to a support plate of a camera shutter for driving shutter blades of the camera shutter. In one embodiment, the lever members and the mounting portion are formed of a single piece of material. In another embodiment, the lever members and the mounting portion comprise separate pieces of material integrally connected together at the hinge portions for relative pivotal movement.

In another embodiment, the lever members are spaced-apart in parallel relation with respect to one another. In another embodiment, the lever members are spaced-apart in angular relation with respect to one another. In yet another embodiment, each of the lever members is generally arcuate-shaped.

In another embodiment, two piezoelectric elements each having first and second ends are connected in series between the lever members. In this embodiment, the first end of one of the piezoelectric elements is connected to the abutment portion of one of the lever members, and the first end of the other piezoelectric element is connected to the abutment portion of the other lever member. The second ends of the piezoelectric elements are connected to each other and to the mounting portion through a support portion integral with the mounting portion.

In another aspect, the present invention is directed to a camera shutter using a driving device according to any of the foregoing embodiments of the present invention as the drive source for opening and closing shutter blades of the camera shutter. The camera shutter comprises an upper case, a lower case having a shutter aperture, an intermediate plate disposed between the upper and lower cases, and shutter blades for opening/closing the shutter aperture. Preferably, the lever members are disposed in spaced-apart relation on opposite sides of the shutter aperture and are positioned such that their range of motion is outside of the shutter aperture.

In one embodiment, the shutter blades are mounted for movement in a shutter chamber defined between the upper case and the intermediate plate, and the lever members are mounted for oscillation in a cutout or thin groove portion formed in the intermediate plate. By this construction, the shutter blades and the lever members undergo movement along different planes of the camera shutter.

BRIEF DESCRIPTION OF THE DRAWINGS

FIGS. 1(a) and 1(b) show a construction of a camera shutter and driving device according to a first embodiment of the present invention, where

DETAILED DESCRIPTION OF THE PREFERRED EMBODIMENTS

Figure 1A:
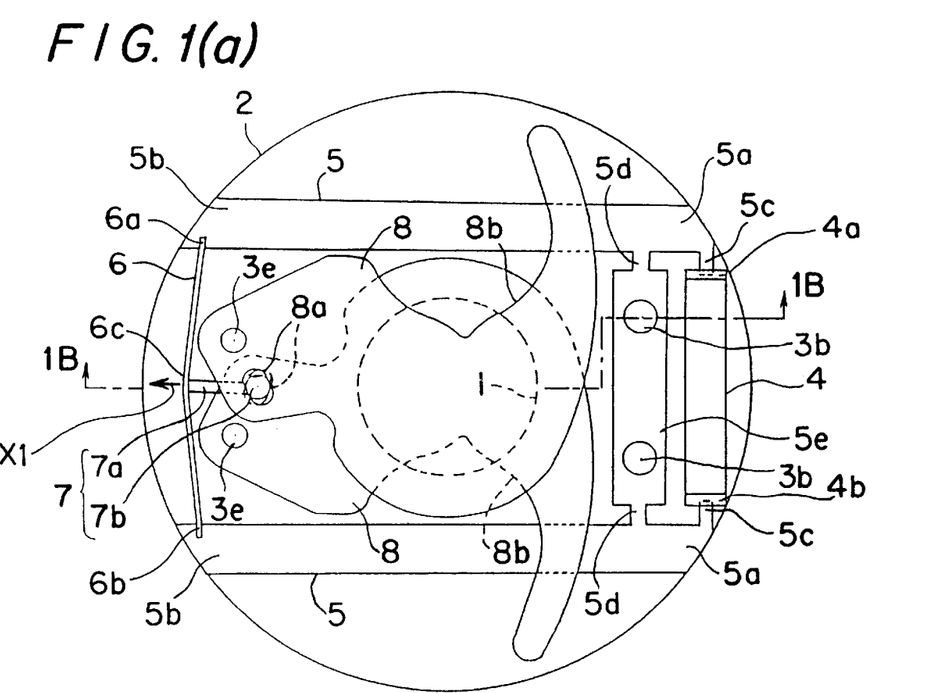
FIG. 1(a) is a top plan view of the camera shutter with the upper case and the intermediate plate being partially omitted and FIG. 1(b) is a cross-sectional view taken along line 1B—1B of FIG. 1(a)
Figure 1B:
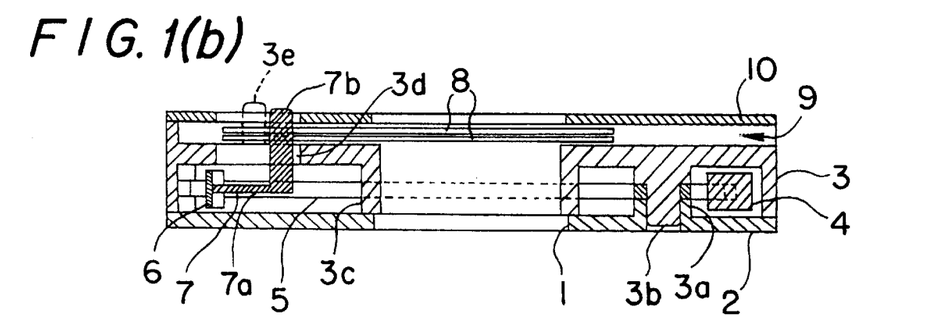
Figure 7:
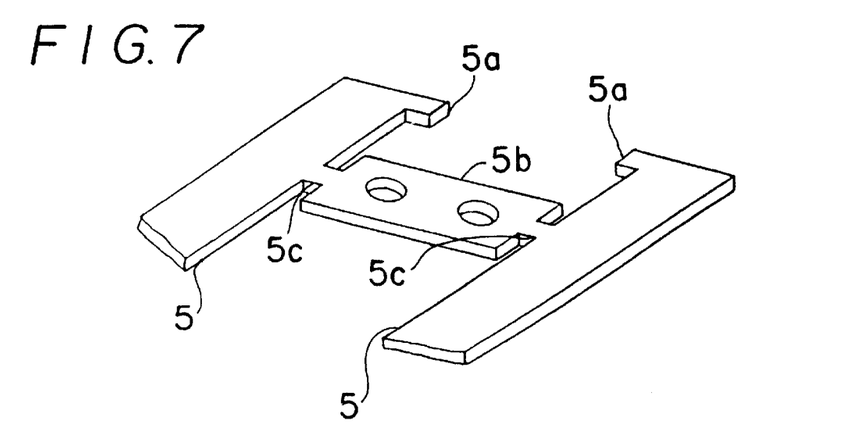
FIG. 7 is a perspective view showing a construction of lever members and hinged portions of the driving device according to the first to fourth embodiments of the present invention.

FIGS. 1(a), 1(b) and 7 show a first embodiment of the camera shutter and driving device according to the present invention. The camera shutter comprises an intermediate plate 3 disposed over a generally disc-shaped lower case 2 having a shutter aperture 1 formed centrally thereof. An upper case 10 is mounted on an upper surface of the intermediate plate 3 so as to define a shutter chamber 9 therebetween. A piezoelectric element 4 having a generally rectangular prism shape is mounted in a first accommodating portion 3a which is formed in a lower surface of the intermediate plate 3. In order to simplify the illustration of FIG. 1A, the portions of the intermediate plate 3 are omitted except for support portions including support shanks 3b and support pins 3e which will be described hereinafter.

The piezoelectric element 4 undergoes elastic movement (i.e., expansion and contraction) upon application thereto of a control voltage. More specifically, the piezoelectric element 4 expands when a voltage is applied thereto, and restores its original shape (i.e., contracts) when the voltage application is interrupted. The control voltage is applied to the piezoelectric element 4 by a control circuit (not shown) through lead wires (not shown). In the present embodiment, a laminated piezoelectric element is preferably used which will undergo a displacement on the order of up to several tens micrometers when the voltage is applied thereto.

According to the present invention, the piezoelectric element 4 forms part of a driving device for opening and closing the shutter aperture 1 of the camera shutter as further described below.

The driving device further comprises a pair of spaced-apart lever members 5 each having a first end portion 5a, a second end portion 5b, an abutment portion 5c disposed at the first end portion 5a, and a hinge portion 5d disposed proximate the first end portion 5a. A mounting portion 5e is disposed between the lever members 5 and has one end integral with the hinge portion 5d of one of the lever members 5, and another end integral with the hinge portion 5d of the other lever member 5. The mounting portion 5e is fixed to the support shanks 3b protruding downwardly from the intermediate plate 3, as shown in FIG. 1(b), to thereby fix the driving device to the camera shutter.

The piezoelectric element 4 is integrally connected to the lever members at the first end portions 5a thereof in parallel relationship to the mounting portion 5e. More specifically, the piezoelectric element 4 has a first protecting portion 4a at one end thereof which is integrally connected to the abutment portion 5c of one of the lever members 5, and a second protecting portion 4b at an opposite end thereof which is integrally connected to the abutment portion 5c of the other lever member 5. When a voltage is applied to the piezoelectric element 4, the elastic displacement of the piezoelectric element at the first end portions 5a of the lever members 5 causes the lever members to displace about the hinge portions 5d so that an enlarged displacement is achieved at the second end portions 5b of the lever members. Preferably, the lever members are disposed in spaced-apart relation on opposite sides of the shutter aperture 1 and are positioned such that their range of motion is outside of the shutter aperture.

An elastic member 6 is interposed between and integrally connected to the lever members 5 at the second end portions 5b thereof for undergoing elastic displacement between the direction of the arrow X1 in FIG. 1(a) (hereinafter referred to as first horizontal direction) and a direction opposite to the first horizontal direction (hereinafter referred to as second horizontal direction) in which the elastic member is restored to its original shape shown in FIG. 1(a). More specifically, the elastic member 6 has an end 6a integrally connected to the end 5b of one of the lever members 5, and an opposite end 6b integrally connected to the end 5b of the other lever member 5. The elastic member 6 has a central portion 6c which is warped or bent in the first horizontal direction in response to rocking motion of the lever members 5. Preferably, the elastic member 6 is made of a sheet of phosphor bronze having a predetermined elasticity and is generally band-shaped. The lever members 5 and the elastic member 6 provide a means by which the elastic displacement of the piezoelectric element 4 at the first end portions 5a of the lever members 5 causes an enlarged deformation or displacement of the central portion 6c of the elastic member in the first horizontal direction. More specifically, when the piezoelectric element 4 expands, the lever members 5 are caused to displace rocking motion about the hinge portions 5d so that the second end portions 5b approach each other. As a result, the elastic member 6 is compressed so that its central portion 6c is largely displaced in the first horizontal direction. Thus, by this construction, a minute expansion of the piezoelectric element 4 can be converted to a sufficiently large displacement of the central portion 6c of the elastic member 6 in the first horizontal direction.

A transmission member 7 is integrally connected between the elastic member 6 and shutter blades 8 of the camera shutter for transmitting the displacement of the elastic member to the shutter blades to open/close the shutter aperture 1. The transmission member 7 comprises a rod portion 7a integrally connected to the central portion 6a of the elastic member 6 and a drive shank portion 7b integrally connected and generally perpendicular to the rod portion and in operational engagement with the shutter blades 8. The elastic member 6 and the transmission member 7 are accommodated in a second accommodating portion 3c of the intermediate plate 3, and the drive shank portion 7b protrudes through an aperture 3d of the intermediate plate 3. During elastic displacement of the elastic member 6 between the first and second horizontal directions resulting from the displacement of the lever members 5, the rod portion 7a and the drive shank portion 7b of the transmission member 7 undergo reciprocal, generally linear displacement in the first and second horizontal directions.

The shutter blades 8 are disposed within the shutter chamber 9 and are supported for pivotal movement by the support pins 3e which extend from the upper surface of the intermediate plate 3. The drive shank portion 7b of the transmission member 7 is operably engaged with a slot 8a of each of the shutter blades 8. The slots 8a are disposed at an intermediate position between the support pins 3d of the intermediate plate 3. The individual shutter blades 8 can be pivoted or rocked away from and towards each other by the horizontal reciprocation (i.e., rightward and leftward directions in FIGS. 1(a) and 1(b)) of the drive shank portion 7b in the first and second horizontal directions during elastic displacement of the elastic member 6. By this construction, the individual shutter blades 8 are rocked apart from each other to form an aperture defined by a cutout portion 8b of each of the shutter blades which confronts the shutter aperture 1 to thereby open the shutter aperture. When the piezoelectric element 4 restores its original shape (or contracts), the elastic beam 6 also restores its original shape by its own elastic force so that the shutter blades 8 also return to their original positions (as shown in FIGS. 1(a) and 1(b) to close the shutter aperture 1.

Since the shutter blades are opened/closed by the expansion/contraction of the piezoelectric element, as described above, the size of the shutter aperture 1 can be adjusted by the magnitude of the voltage to be applied to the piezoelectric element. This voltage to be applied to the piezoelectric element is controlled by a control circuit (not shown).

In the embodiment of FIGS. 1(a) and 1(b), the camera shutter is generally circular-shaped. The support structure (including the support pins 3e and the transmission member 7) for the shutter blades 8 is positioned at one side of the shutter aperture 1 (i.e., left side in FIGS. 1(a)–1(b)), and the piezoelectric element 4 and the mounting portion 5e acting as a drive source for opening/closing the shutter blades are positioned at the other side of the shutter aperture (i.e., right side in FIGS. 1(a)–1(b)). By this construction, a camera shutter having a high space efficiency is obtained.

In this embodiment, as shown in FIG. 7, the lever members 5 and the mounting portion 5b are preferably formed from a single piece of material, thereby providing for a decrease in the manufacturing cost and a reduction in the number of parts for the camera shutter.

Figure 2:
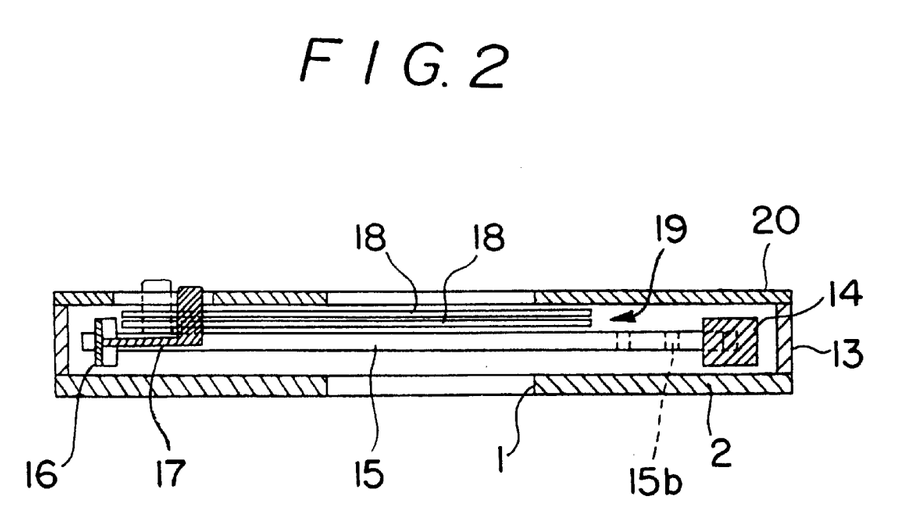
FIG. 2 is a cross-sectional view of a second embodiment of the camera shutter according to the present invention with the intermediate plate being partially omitted.

FIG. 2 shows a second embodiment of the camera shutter according to the present invention. The structure of the camera shutter shown in FIG. 2 is substantially identical to the structure of the camera shutter set forth above for the first embodiment, except that the thickness of the camera shutter of the second embodiment is further reduced in size by changing the structure of an intermediate plate 13 and the positions of a piezoelectric element 14 and an elastic member 16. More specifically, in this embodiment the intermediate plate 13 is cut out exclusively at a position corresponding to the rocking range of lever members 15 and at positions of the piezoelectric element 14 and a joint portion 15b. An extremely limited portion of the intermediate plate 13 is shown in FIG. 2 because the sectional position corresponds to the cutout.

In the construction of the first embodiment, the intermediate plate 3, the lever members 5 and the shutter blades 8 overlap within the rocking range of the lever members 5, and small clearances for play are taken to prevent their mutual contacts, so that the construction is accordingly thickened. In the second embodiment, however, the overlapping portion of the lever members 15 and the shutter blades 18 corresponds to the cutout of the intermediate plate 13, and the overlapping portion of the shutter blades 18 and the intermediate plate 13 corresponds to the outside of the rocking range of the lever members 15, so that the intermediate plate 13, the lever members 15 and the shutter blades 18 will not overlap at one portion. Moreover, the piezoelectric element 14 and the elastic beam 16 are arranged in positions outside of the moving ranges of the shutter blades 18.

By the foregoing construction, the elastic member 16 and a transmission member 17 can be arranged in positions where they are close to the shutter blades 18 in the thickness direction without any interference with each other so that the space in the thickness direction can be reduced to accordingly reduce the thickness of the camera shutter as a whole. In this construction, too, a shutter chamber 19 can retain a sufficient space from an upper case 20 while allowing the shutter blades 18 to undergo unimpeded pivotal motion. Moreover, a drive shank portion 17b of the transmission member 7 is shortened so that the elastic displacement of the elastic member 16 can be efficiently transmitted to the shutter blades 18.

Figure 3:
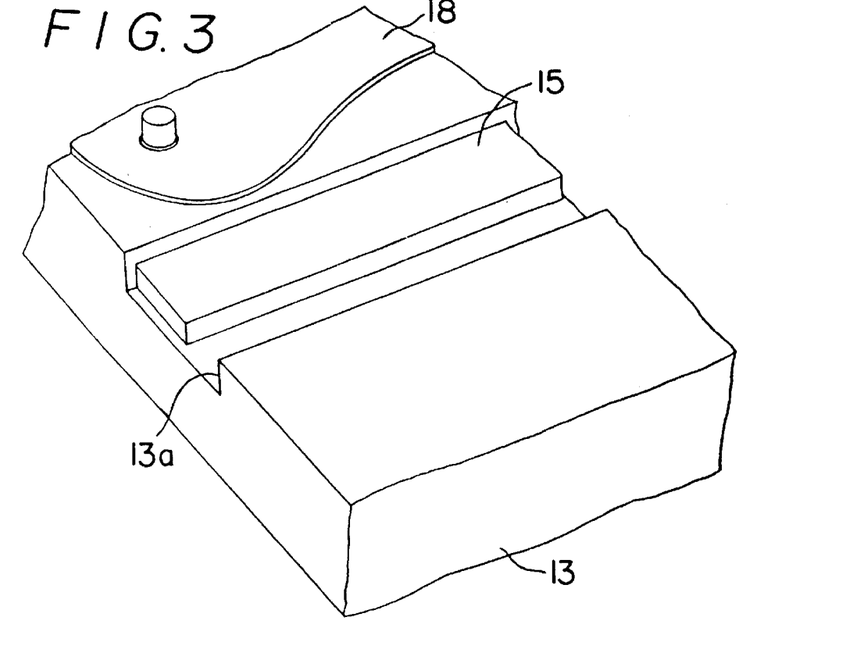
FIG. 3 is a perspective view showing another example of the intermediate plate of the second embodiment.
Figure 4:
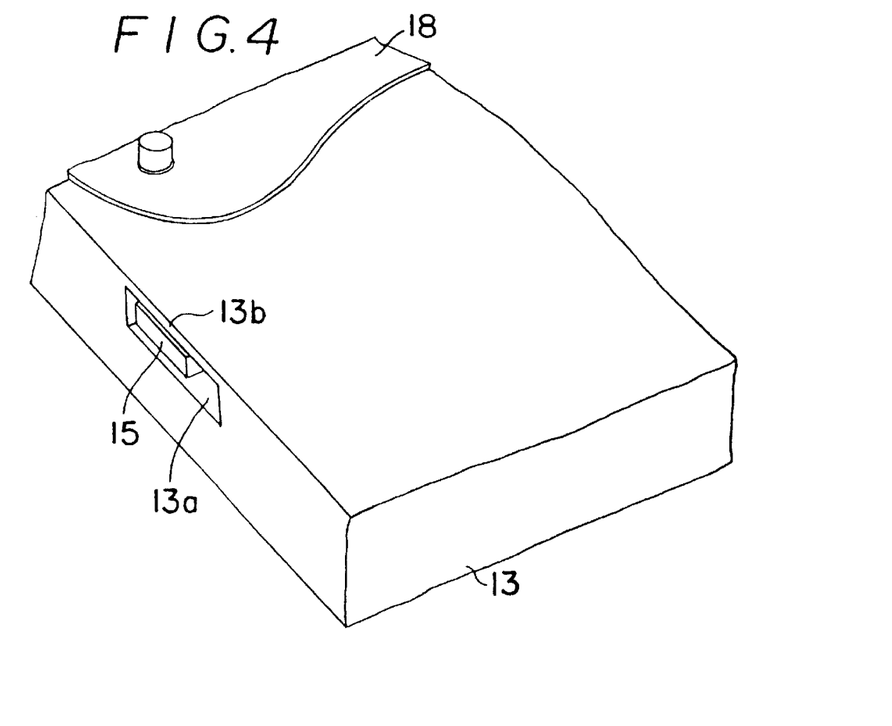
FIG. 4 is a perspective view showing still another example of the intermediate plate of the second embodiment.

Even if the complete cutout is not formed in the intermediate plate as in the second embodiment, the effective reduction in the thickness of the camera shutter can be obtained by forming a thin groove portion 13a to allow the lever members 15 to rock therein, as shown in FIG. 3. As shown in FIG. 4, moreover, a face 13b for sliding the shutter blades may be left over the thin groove portion 13a.

Figure 5:
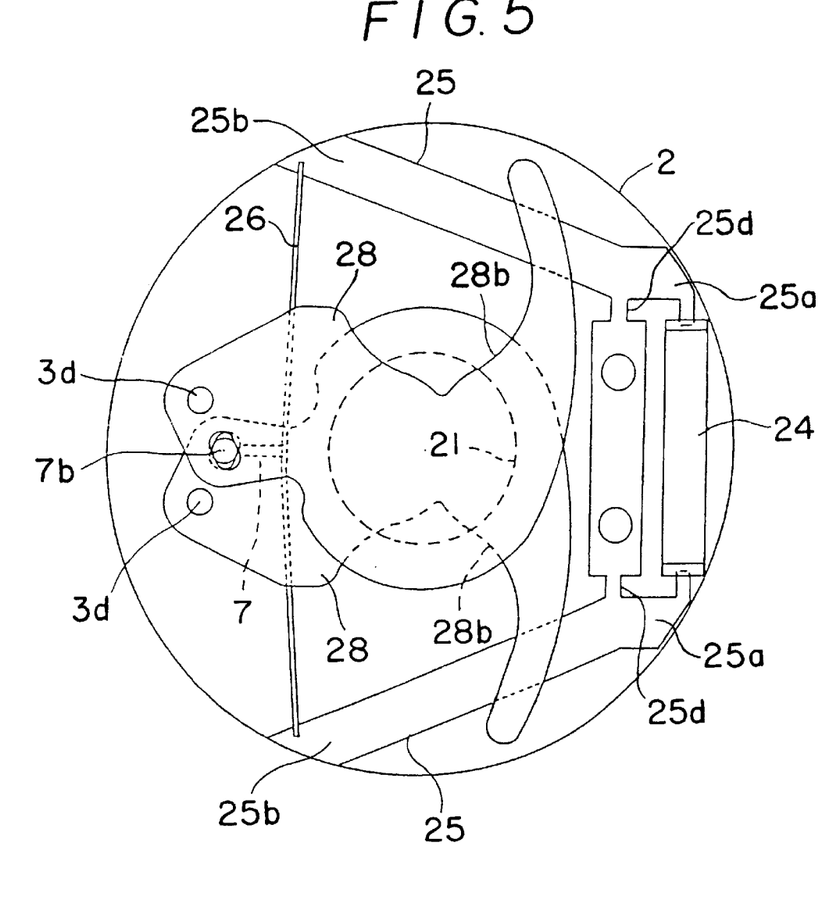
FIG. 5 is a top plan view of a third embodiment of the camera shutter and driving device according to the present invention with the upper case and the intermediate plate being partially omitted.

FIG. 5 shows a third embodiment of the driving device for a camera shutter according to the present invention. In the previous first and second embodiments, the lever members are spaced-apart in parallel relation with respect to each other. In the third embodiment, however, lever members 25 are disposed at an angle relative to each other so that the distance between the second end portions 25b of the lever members is greater than the distance between the first end portions 25a and the distance between the hinge portions 25d of the lever members. By this construction, the span of an elastic member 26 fixed to the second end portions 25b of the lever members is greater than the span of the elastic members 6 and 16 of the first and second embodiments, respectively.

Moreover, in the third embodiment the amplitude (or displacement) of the elastic member 26 can be enlarged for an equal extension of a piezoelectric element 24. As a result, the opening of shutter blades 28 (i.e., the spacing between cutouts 28b) can be increased to increase a shutter aperture 21 to thereby widen the opening range of the shutter aperture. The remaining construction of the camera shutter and the driving device in the third embodiment is similar to that of the first embodiment or the second embodiment.

Figure 6:
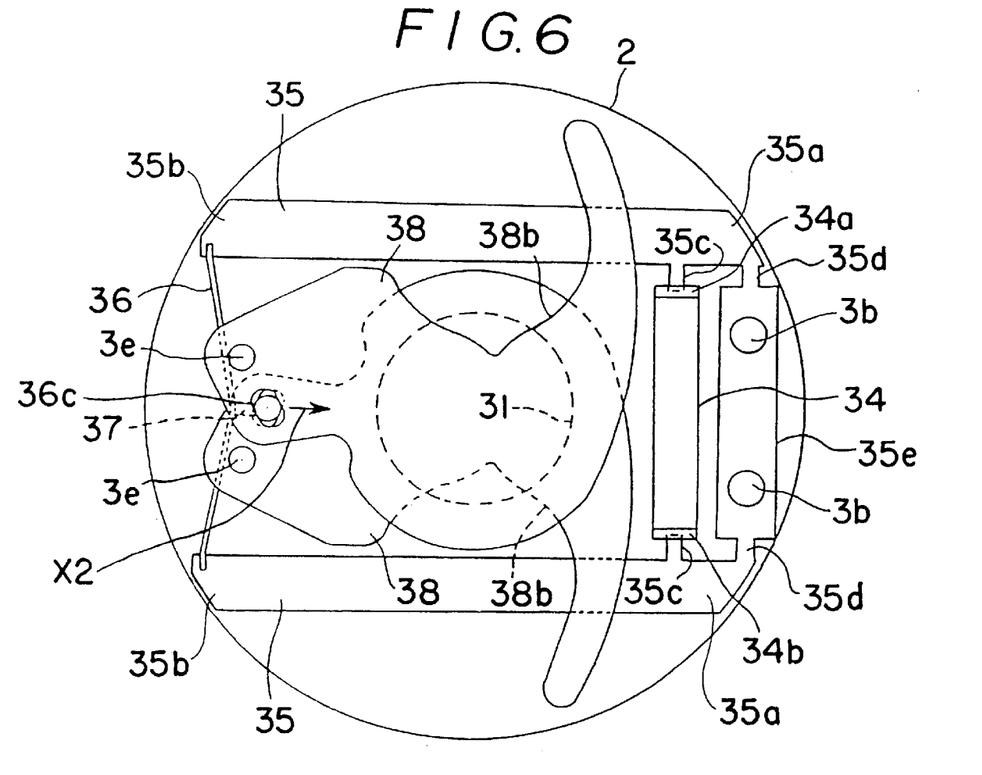
FIG. 6 is a top plan view of a fourth embodiment of the camera shutter and driving device according to the present invention with the upper case and the intermediate plate being partially omitted.

FIG. 6 shows a fourth embodiment of the driving device for a camera shutter according to the present invention. In the previous embodiments, the mounting portion is disposed between the piezoelectric element and the elastic member so that elastic movement of the piezoelectric element displaces the lever members in a first direction. However, in the fourth embodiment, a piezoelectric element 34 is disposed between a mounting portion 35e and an elastic member 36 so that elastic movement of the piezoelectric element 34 displaces lever members 35 in a second direction which is the inverse of the first direction. More specifically, the mounting portion 35e is disposed between the first end portions 35a of the lever members 35 and has one end thereof integral with an abutment portion 35d of one of the lever members 35 and another end thereof integral with an abutment portion 35d of the other lever member 35. The mounting portion 35e is fixed to the support shanks 3b of the intermediate plate 3 as described above for the first embodiment shown in FIGS. 1(a)–1(b), thereby fixing the driving device to the camera shutter.

The piezoelectric element 34 is integrally connected to the lever members 35 proximate the first end portions 35a thereof and in parallel relationship to the mounting portion 35e. More specifically, the piezoelectric element 34 has a first protecting portion 34a at one end thereof which is integrally connected to a hinge portion 35c of one of the lever members 35, and a second protecting portion 34b at an opposite end thereof which is integrally connected to a hinge portion 35c of the other lever member 35. When a voltage is applied to the piezoelectric element 34, the elastic displacement of the piezoelectric element proximate the first end portions 35a of the lever members 35 causes the lever members to displace about the hinge portions 35d so that an enlarged displacement is achieved at the second end portions 35b of the lever members.

The elastic member 36 is interposed between and is integrally connected to the lever members 35 at the second end portions 35b thereof for elastic displacement in the direction of the arrow X2 shown in FIG. 6 and in a direction opposite to the direction of the arrow X2, in which the elastic member is restored to its original shape shown in FIG. 6. The elastic member 36 has a central portion 36c which is warped or bent in the direction of the arrow X2 (i.e., towards a shutter aperture 31). A transmission member 37 is integrally connected to the central portion 36c of the elastic member 36 and is disposed between the elastic member 36 and shutter blades 38 of the camera shutter for transmitting elastic displacement of the elastic member to the shutter blades to open/close the shutter aperture 31 as described above for the first embodiment shown in FIGS. 1(a)–1(b).

The remainder of the construction is similar to those of the foregoing individual embodiments. Since, in this embodiment, the elastic member 36 is elastically displaced in the direction of the arrow X2 when the piezoelectric element 34 undergoes elastic expansion, cutouts 38b of the shutter blades provide the maximum aperture when the elastic member 36 is extended into a straight shape from the warped state shown in FIG. 6.

In the foregoing first to fourth embodiments, as shown in FIGS. 1(a) and 1(b) and FIG. 7, the hinged portions 5c, the individual lever member 5, and the mounting portion 5b are formed from a single piece of material, thereby providing for a decrease in the manufacturing cost and a reduction in the number of parts. In the aforementioned construction, however, the hinged portions 5c themselves deform to rock the levers. As a result, the stresses at the hinged portions 5c are high so that fatigue failure may occur.

Figure 8:
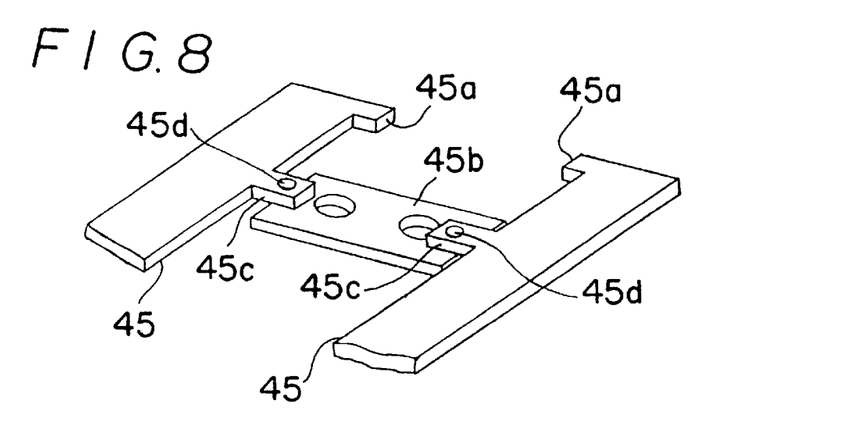
FIG. 8 is a perspective view showing a construction of levers and hinged portions of the driving device according to a fifth embodiment of the present invention.

According to a fifth embodiment of the driving device for a camera shutter, as shown in FIG. 8, lever members 45 and a mounting portion 45b are formed of separate pieces of material and are integrally connected together by connecting members. More specifically, opposite end portions of the mounting portion 45b are pivotally connected to a respective hinge portion 45c in overlapping relation by support pins 45d. The hinged portions 45c and the lever members 45 can pivot about the support pins 45d so that resistances produced during displacement of the lever members are reduced to prevent the occurrence of fatigue failure. The modifications of the driving device described for the embodiments of FIGS. 2–6 are also applicable for the fifth embodiment.

Figure 9:
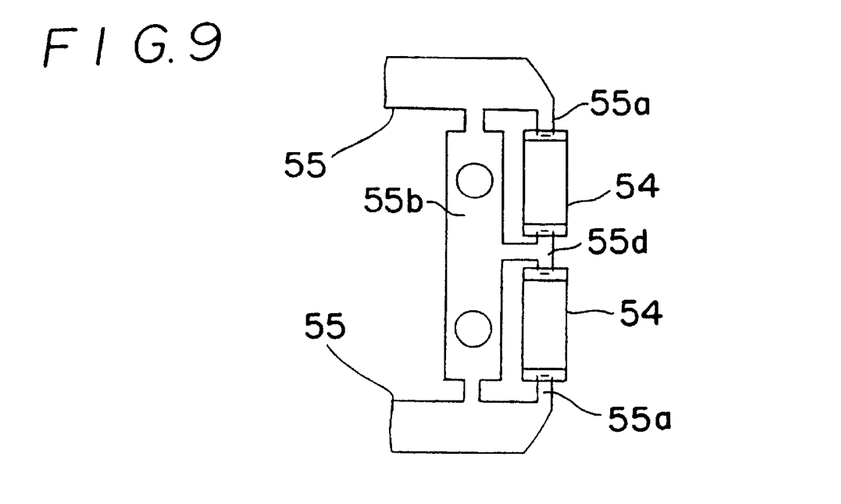
FIG. 9 is a top plan view showing piezoelectric elements of the driving device according to a sixth embodiment of the present invention.

Although the foregoing first to fifth embodiments have been exemplified by a single piezoelectric element, two or more piezoelectric elements may be employed to satisfy the demand for particular shutter performances. FIG. 9 shows a sixth embodiment of the driving device for a camera shutter according to the present invention in which two piezoelectric elements 54 are connected in series. In this example, a mounting portion 55b is provided at a central portion thereof with a support portion 55d for integrally supporting the piezoelectric elements 54 at one end thereof. The other end of each of the piezoelectric elements 54 is integrally connected to a respective abutment portion 55a of lever members 55. The piezoelectric elements 54 displace the lever members 55 equivalently and efficiently when a voltage is applied to the piezoelectric elements.

The remaining structure of the driving device according to the sixth embodiment is the same as the structure described above for any of the first to fifth embodiments. The modifications described above for the second to fifth embodiments shown in FIGS. 2–8 are also applicable for the sixth embodiment.

Figure 10:
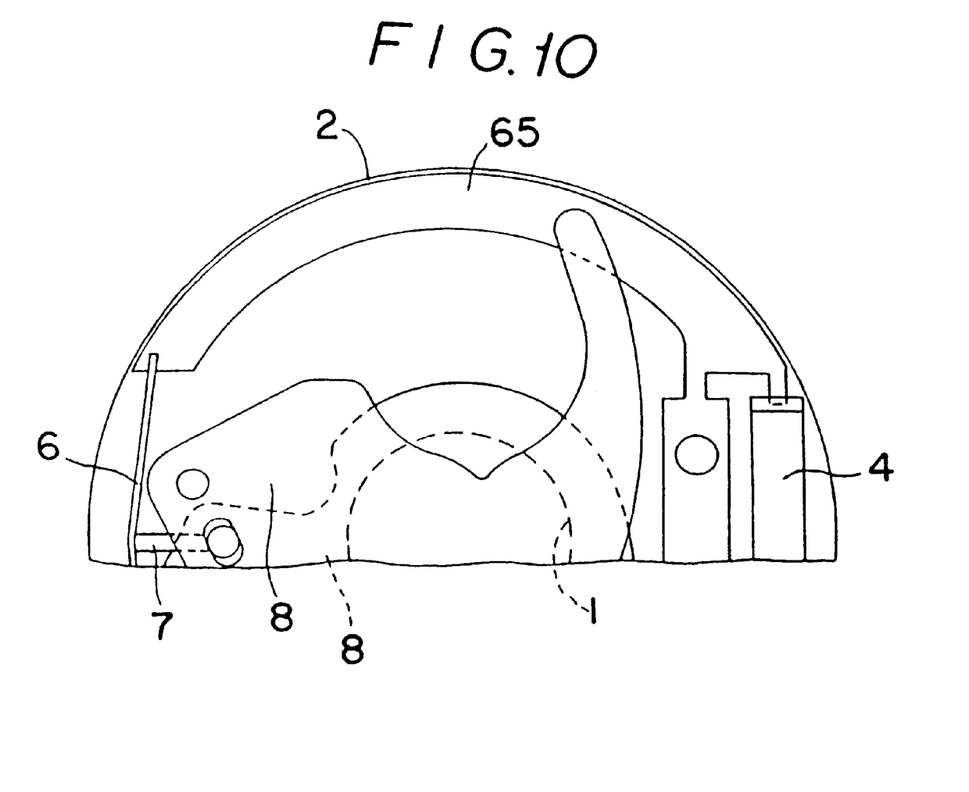
FIG. 10 is a partial top plan view showing a lever member of the driving device according to a seventh embodiment of the present invention.

In all of the foregoing embodiments, the lever members are generally straight-shaped. FIG. 10 shows a seventh embodiment of the driving device for a camera shutter according to the present invention in which lever members 65 are generally arcuate-shaped to conform to the generally circular contour of the camera shutter.

According to the present invention, the complicated step motor typically used in the prior art is replaced by a piezoelectric element as the drive source for opening/closing the shutter blades of the camera shutter. Furthermore, the complicated power transmission mechanism, such as gear trains, is replaced by a simpler mechanism including lever members and an elastic member for transmitting the elastic movement of the piezoelectric element to shutter blades for opening/closing a shutter aperture. As a result, the construction of the camera shutter can be simplified to lower the manufacturing cost by reducing the number of parts and to permit the shutter aperture to be opened an closed quickly. Moreover, the lever members and the elastic members can be made of thin pieces of materials to reduce the overall thickness of the camera shutter.

What is claimed is:

1. A driving device for a shutter having a shutter aperture and movable elements for opening and closing the shutter aperture, the driving device comprising: a piezoelectric driving device for undergoing elastic movement upon application of a voltage thereto; and transmission means for transmitting a driving force generated by the elastic movement of the piezoelectric driving device to movable elements of a shutter to open and close a shutter aperture of the shutter, the transmission means comprising a pair of lever members each having a first end portion and a second end portion, a mounting portion having a first end connected to one of the lever members and a second end connected to the other lever member, an elastic member having a first end integrally connected to the second end portion of one of the lever members and a second end integrally connected to the second end portion of the other lever member, and a transmission member integrally connected to the elastic member.

2. A driving device according to claim 1; wherein each of the lever members has an abutment portion disposed at the first end portion of the lever member, and a hinge portion disposed proximate the first end portion of the lever member; and wherein the first end of the mounting portion is integrally connected to the hinge portion of one of the lever members and the second end of the mounting portion is integrally connected to the hinge portion of the other lever member.

3. A driving device according to claim 2; wherein the piezoelectric driving device comprises a piezoelectric element having a first end integrally connected to the abutment portion of one of the lever members and a second end integrally connected to the abutment portion of the other lever member, such that when a voltage is applied to the piezoelectric element, the piezoelectric element undergoes elastic movement which induces displacement of the lever members about the respective hinge portions, the displacement of the lever members induces elastic displacement of the elastic member, and the elastic displacement of the elastic member is transmitted to the movable elements of the shutter by the transmission member to open and close the shutter aperture.

4. A driving device according to claim 3; wherein the mounting portion is disposed between the piezoelectric element and the elastic member.

5. A driving device according to claim 3; wherein the piezoelectric element is disposed between the mounting portion and the elastic member.

6. A driving device according to claim 2; wherein the lever members, the abutment portions, the hinge portions and the mounting portion comprise a single piece of material.

7. A driving device according to claim 2; wherein each lever member and corresponding abutment portion and hinge portion and the mounting portion are comprised of separate pieces of material, the mounting portion being pivotally connected at the ends thereof to the respective hinge portions of the lever members.

8. A driving device according to claim 2; wherein the piezoelectric driving device comprises a pair of piezoelectric elements integrally connected to and between the lever members.

9. A driving device according to claim 8; wherein each of the piezoelectric elements has a first end and a second end, the first end of one of the piezoelectric elements being integrally connected to the abutment portion of one of the lever members, the first end of the other piezoelectric element being integrally connected to the abutment portion of the other lever member, and the second ends of the piezoelectric elements being integrally connected to each other and to the mounting portion, whereby when a voltage is applied to the piezoelectric elements, the piezoelectric elements undergo elastic movement which induces displacement of the lever members about the respective hinge portions, the displacement of the lever members induces elastic displacement of the elastic member, and the elastic displacement of the elastic member is transmitted to the movable elements of the shutter by the transmission member to open and close the shutter aperture.

10. A driving device according to claim 2; wherein the lever members are spaced-apart in parallel relation to one another.

11. A driving device according to claim 2; wherein the lever members are disposed in angular relation to one another.

12. A driving device according to claim 2; wherein the lever members are generally arcuate-shaped.

13. A driving device according to claim 2; wherein the elastic member is bent at a central portion thereof.

14. A driving device according to claim 13; wherein the transmission member is connected to the central portion of the elastic member.

15. A camera shutter comprising: means defining a shutter aperture; at least one movable element for opening and closing the shutter aperture; a piezoelectric driving device for undergoing elastic movement upon application of a voltage thereto; and transmission means for transmitting a driving force generated by the elastic movement of the piezoelectric driving device to the movable element to open and close the shutter aperture, the transmission means comprising a pair of lever members each having a first end portion and a second end portion, a mounting portion having a first end connected to one of the lever members and a second end connected to the other lever member, an elastic member having a first end integrally connected to the second end portion of one of the lever members and a second end integrally connected to the second end portion of the other lever member, and a transmission member integrally connected at one end to the elastic member and operably connected at an opposite end to the movable element.

16. A camera shutter according to claim 15; wherein the piezoelectric driving device comprises one piezoelectric element.

17. A camera shutter according to claim 15; wherein the piezoelectric driving device comprises a pair of piezoelectric elements connected in series.

18. A camera shutter according to claim 15; wherein each of the lever members has an abutment portion disposed at the first end portion of the lever member, and a hinge portion disposed proximate the first end portion of the lever member, a; and wherein the first end of the mounting portion is integrally connected to the hinge portion of one of the lever members and a second end of the mounting portion is integrally connected to the hinge portion of the other lever member.

19. A camera shutter according to claim 18; wherein the piezoelectric driving device comprises a piezoelectric element having a first end integrally connected to the abutment portion of one of the lever members and a second end integrally connected to the abutment portion of the other lever member such that when a voltage is applied to the piezoelectric element, the piezoelectric element undergoes elastic movement which induces displacement of the lever members about the respective hinge portions, the displacement of the lever members induces elastic displacement of the elastic member, and the elastic displacement of the elastic member is transmitted to the movable element by the transmission member to open and close the shutter aperture.

20. A camera shutter according to claim 19; wherein the mounting portion is disposed between the piezoelectric element and the elastic member.

21. A camera shutter according to claim 19; wherein the piezoelectric element is disposed between the mounting portion and the elastic member.

22. A camera shutter according to claim 18; wherein the lever members, the abutment portions, the hinge portions and the mounting portion comprise a single piece of material.

23. A camera shutter according to claim 18; wherein each lever member and corresponding abutment portion and hinge portion and the mounting portion are comprised of separate pieces of material, the mounting portion being pivotally connected at the ends thereof to the respective hinge portions of the lever members.

24. A camera shutter according to claim 18; wherein the piezoelectric driving device comprises a pair of piezoelectric elements integrally connected to and between the lever members.

25. A camera shutter according to claim 24; wherein each of the piezoelectric elements has a first end and a second end, the first end of one of the piezoelectric elements being integrally connected to the abutment portion of one of the lever members, the first end of the other piezoelectric element being integrally connected to the abutment portion of the other lever member, and the second ends of the piezoelectric elements being integrally connected to each other and to the mounting portion, whereby when a voltage is applied to the piezoelectric elements, the piezoelectric elements undergo elastic movement which induces displacement of the lever members about the respective hinge portions, the displacement of the lever members induces elastic displacement of the elastic member, and the elastic displacement of the elastic member is transmitted to the movable element by the transmission member to open and close the shutter aperture.

26. A camera shutter according to claim 18; wherein the lever members are spaced-apart in parallel relation to one another.

27. A camera shutter according to claim 18; wherein the lever members are disposed in angular relation to one another.

28. A camera shutter according to claim 18; wherein the lever members are generally arcuate-shaped.

29. A camera shutter according to claim 18; wherein the elastic member is bent at a central portion thereof.

30. A camera shutter according to claim 29; wherein the transmission member is connected to the central portion of the elastic member.

31. A camera shutter comprising:
   means defining a shutter aperture;
   shutter blades for opening and closing the shutter aperture;
   a pair of lever members spaced apart and confronting each other across the shutter aperture, each of the lever members having a first end portion and a second end portion;
   a piezoelectric element connected to and between the lever members at the first end portions thereof for undergoing elastic deformation to displace the lever members;
   an elastic member connected to and between the lever members at the second end portions thereof for elastic displacement in response to displacement of the lever members; and
   a transmission member integrally connected to a central portion of the elastic member for transmitting the displacement of the elastic member to the shutter blades to open and close the shutter aperture.

32. A camera shutter according to claim 31; wherein the first end portion of each of the lever members comprises a hinge portion about which the respective lever member displace during elastic movement of the piezoelectric element; and wherein the distance between the second end portions of the lever members is greater than the distance between the hinge portions thereof.

33. A camera shutter according to claim 32; further comprising a first case, a second case, an intermediate plate disposed between the first and second cases to define a chamber between the first case and the intermediate plate, and a thin groove disposed in the intermediate plate; wherein the shutter blades are disposed in the chamber for movement along respective first and second planes to open and close the shutter aperture, and the lever members are disposed within the thin groove in the intermediate plate for displacement along a third plane different from the first and second planes.

34. A camera shutter according to claim 32; wherein the hinge portions of the lever members are disposed between the piezoelectric element and the elastic member.

35. A camera shutter according to claim 34; further comprising a first case, a second case, an intermediate plate disposed between the first and second cases to define a chamber between the first case and the intermediate plate, and a thin groove disposed in the intermediate plate; wherein the shutter blades are disposed in the chamber for movement along respective first and second planes to open and close the shutter aperture, and the lever members are disposed within the thin groove in the intermediate plate for displacement along a third plane different from the first and second planes.

36. A camera shutter according to claim 32; wherein piezoelectric element is disposed between the hinged portions of the lever members and the elastic member.

37. A camera shutter according to claim 36; further comprising a first case, a second case, an intermediate plate disposed between the first and second cases to define a chamber between the first case and the intermediate plate, and a thin groove disposed in the intermediate plate; wherein the shutter blades are disposed in the chamber for movement along respective first and second planes to open and close the shutter aperture, and the lever members are disposed within the thin groove in the intermediate plate for displacement along a third plane different from the first and second planes.

38. A camera shutter according to claim 31; wherein the first end portion of each of the lever members comprises a hinge portion about which the respective lever member oscillates during elastic movement of the piezoelectric element.

39. A camera shutter according to claim 38; wherein the hinge portions of the lever members are disposed between the piezoelectric element and the elastic member.

40. A camera shutter according to claim 38; wherein piezoelectric element is disposed between the hinged portions of the lever members and the elastic member.

41. A camera shutter according to claim 38; further comprising a first case, a second case, an intermediate plate disposed between the first and second cases to define a chamber between the first case and the intermediate plate, and a thin groove disposed in the intermediate plate; wherein the shutter blades are disposed in the chamber for movement along respective first and second planes to open and close the shutter aperture, and the lever members are disposed within the thin groove in the intermediate plate for displacement along a third plane different from the first and second planes.

* * * * *